G. VON BECHEN.
CHANGE OVER DEVICE OR VALVE FOR SIEMENS-MARTIN OR OTHER REGENERATIVE FURNACES.
APPLICATION FILED FEB. 26, 1909.

927,930.

Patented July 13, 1909.

Witnesses:
R. E. Babcock
G. M. Copenhaver

Inventor:
Gustav von Bechen
by
W. H. Babcock
Attorney

UNITED STATES PATENT OFFICE.

GUSTAV VON BECHEN, OF KALK, NEAR COLOGNE, GERMANY.

CHANGE-OVER DEVICE OR VALVE FOR SIEMENS-MARTIN OR OTHER REGENERATIVE FURNACES.

No. 927,930.  Specification of Letters Patent.  Patented July 13, 1909.

Application filed February 26, 1909. Serial No. 480,260.

*To all whom it may concern:*

Be it known that I, GUSTAV VON BECHEN, a citizen of the German Empire, residing at Kalk, near Cologne, in the Province of Rhenish Prussia, Kingdom of Prussia, Germany, have invented certain new and useful Improvements in Change-Over Devices or Valves for Siemens-Martin or other Regenerative Furnaces; and I do hereby declare the following to be a full, clear, and exact description of the invention, such as will enable others skilled in the art to which it appertains to make and use the same.

The subject-matter of the present application is a change-over device or valve for Siemens-Martin or other regenerative furnaces.

The device comprises a cylindrical casing provided with four unions and with a change-over valve revoluble about the axis of the cylinder. Similarly shaped valves are already well known but these do not act absolutely reliably as the fitting of the rotary valve in the cylinder and particularly against the end walls of the casing is not perfect. In the case of the new change-over device the valve which is likewise revoluble in a cylindrical casing provided with four openings possesses at its ends piston-like disks which are applied against the periphery of the working cylinder and so pack the device particularly in the axial direction. This new formation of the valve offers the additional advantage that the pivots of the valve are relieved from pressure by the cylindrical end disks. It is also of advantage to make both the end disks and the valve itself hollow so that cooling water may be supplied continuously through the pivots which are also hollow and thereby prevent the valve from sticking fast through becoming hot.

One embodiment of a device according to the present invention is illustrated, by way of example, in the accompanying drawing.

Figure 1:
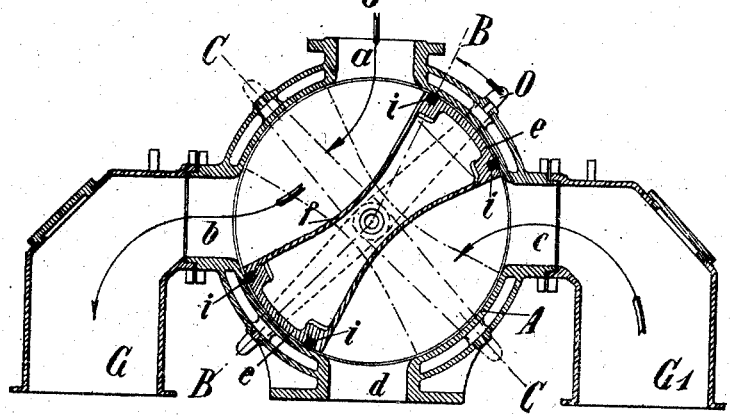
Figure 2:
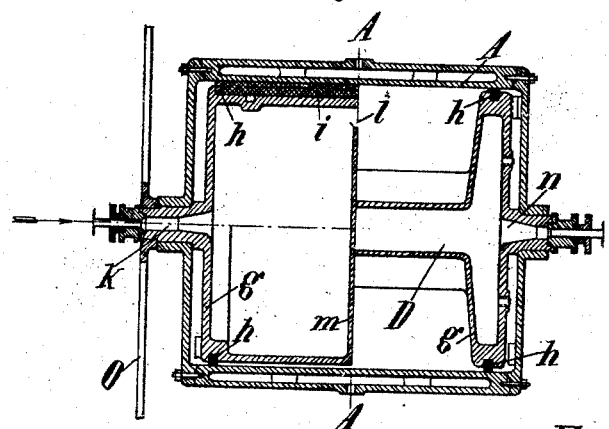
Figure 3:
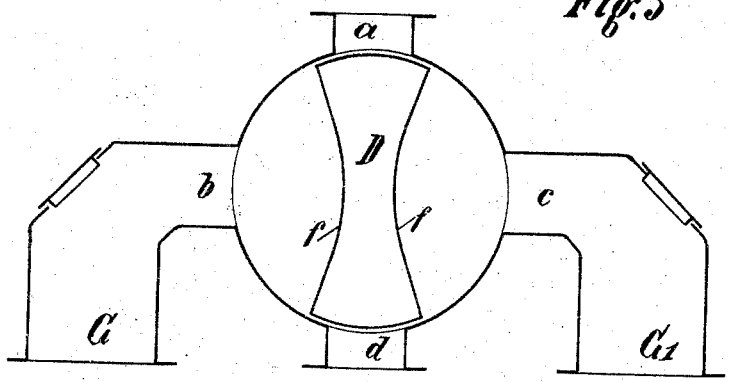

In said drawing: Figure 1 is a transverse cross-section of the device on the line A—A of Fig. 2, Fig. 2 a longitudinal section, the left half being on the line B—B of Fig. 1 and the right half being on the line C—C of Fig. 1, and Fig. 3 a diagrammatic transverse section similar to that shown in Fig. 1, the valve however being represented in another position.

In the four-way cylinder or casing A provided with the unions $a$, $b$, $c$, $d$, the change-over valve D is revolubly arranged. Said valve possesses a narrow longish hollow body, the narrow sides $e$ of which are convex to correspond with the cylinder, while the other surfaces $f$ are concave. At each end of the said body of the valve D there is a hollow circular piston $g$. Each piston is surrounded by a packing-ring $h$ and additional packing $i$ lies in longitudinal grooves in the valve body. In this manner the change-over valve is packed in the cylinder perfectly in every respect particularly in the axial direction of the same. The valve is hollow and is provided with one or more strengthening walls. Cooling water may be caused to enter in the direction of the arrow through the hollow pivot $k$. Said water flows through the whole interior of the valve in a manner determined by the strengthening wall $m$ and passes out through the other pivot $n$. When the valve is in the position indicated in Fig. 1, the union $a$ is connected with the connecting piece G, so that the gas or air entering at $a$ passes through G to the furnace and the gases from the furnace pass simultaneously through the connecting-piece G, and the union $c$ into the union $d$ leading to the smoke-flue. If the valve be turned with the aid of the lever O into the position indicated in Fig. 3, then the supply at $a$ of air or gas is entirely cut off and the opening in the union $d$ is likewise closed. On turning the valve still farther into the position indicated by the lines formed of dots and dashes in Fig. 1, the valve connects union $a$ with the union $c$ and the connecting piece $G_1$, so that the gas or air is now led in the reverse direction to the furnace, while the gases from the furnace can now pass through the connecting-piece G, the union $b$ and the union $d$ into the smoke-flue. In all the positions of the change-over valve it is impossible for the gas or the air to pass through the union $a$ or the cylinder A directly into the smoke-flue.

Having now described my invention I declare that what I desire to secure by Letters Patent is:

1. In combination with a four-way casing, a hollow change over valve turning therein, provided with a hollow disk and adapted to allow a current of fluid to pass through the interior of said valve substantially as set forth.

2. In combination with a four-way casing, a hollow change over valve turning therein, provided at its ends with hollow disks, and adapted to allow a current of fluid to pass through the interior of said valve and disks substantially as set forth.

3. In combination with a four way casing, a hollow change over valve turning therein, provided with hollow disks, also turning within said casing at the ends thereof, and with tubular journals turning in bearings formed on said casing, said journals, disks and valve being adapted to permit a current of fluid to pass through them substantially as set forth.

4. In combination with a cylindrical four-way casing, a hollow change over valve turning therein and having two longitudinal and convex faces, each of which faces fits the inner face of the casing and has two strips of packing set into it near its edges, said valve being also provided with terminal disks connected to the body thereof and turning within the ends of said cylinder, each of said disks being surrounded by a packing ring $h$ set into a recess of its periphery and the said valve and disk being adapted to permit a current of fluid to pass through the same substantially as set forth.

In testimony whereof, I have signed my name to this specification in the presence of two subscribing witnesses.

GUSTAV VON BECHEN.

Witnesses:
LOUIS VANDORN,
R. H. DUNLAP.